United States Patent
Woerner et al.

(10) Patent No.: US 8,894,157 B2
(45) Date of Patent: Nov. 25, 2014

(54) MULTI-CHANNEL PRESSURE CONTROL MODULE HAVING ONLY ONE PRESSURE SENSOR

(75) Inventors: Ralf Woerner, Tiefenbronn (DE); Friedbert Roether, Cleebronn (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 151 days.

(21) Appl. No.: 13/517,964

(22) PCT Filed: Dec. 15, 2010

(86) PCT No.: PCT/EP2010/069746
§ 371 (c)(1),
(2), (4) Date: Aug. 8, 2012

(87) PCT Pub. No.: WO2011/085893
PCT Pub. Date: Jul. 21, 2011

(65) Prior Publication Data
US 2012/0299368 A1 Nov. 29, 2012

(30) Foreign Application Priority Data
Dec. 21, 2009 (DE) .......................... 10 2009 059 811

(51) Int. Cl.
*B60T 13/74* (2006.01)
*B60T 17/18* (2006.01)
*B60T 8/32* (2006.01)
*B60T 13/68* (2006.01)

(52) U.S. Cl.
CPC ................. *B60T 8/327* (2013.01); *B60T 17/18* (2013.01); *B60T 13/683* (2013.01)
USPC ......... 303/3; 303/15; 303/118.1; 303/122.05; 303/168

(58) Field of Classification Search
CPC ............. B60T 8/32; B60T 8/38; B60T 8/323; B60T 8/329; B60T 8/341; B60T 8/342; B60T 13/68; B60T 13/683; B60T 17/18; B60T 17/22; B60T 17/227
USPC ................... 303/3, 15, 16, 113.1, 118.1, 122, 303/122.04, 122.05, 122.09, 122.15, 168
See application file for complete search history.

(56) References Cited

U.S. PATENT DOCUMENTS

| | | | | |
|---|---|---|---|---|
| 5,427,440 | A | * | 6/1995 | Ward et al. .................... 303/3 |
| 6,540,307 | B1 | * | 4/2003 | Ward et al. .................... 303/3 |

(Continued)

FOREIGN PATENT DOCUMENTS

| | | |
|---|---|---|
| DE | 40 30 980 | 4/1992 |
| EP | 0 830 997 | 3/1998 |

(Continued)

OTHER PUBLICATIONS

European Patent Office, International Preliminary Report on Patentability, Jun. 26, 2012, from International Patent Application No. PCT/EP2010/069746, filed on Dec. 15, 2010.

(Continued)

*Primary Examiner* — Thomas J Williams
(74) *Attorney, Agent, or Firm* — Kenyon & Kenyon LLP

(57) ABSTRACT

An electromagnetic pressure control module for a pressure-medium-actuated brake system of a motor vehicle, having at least two channels, the module being controlled electrically in undisrupted operation and pneumatically in the event of a fault in the electrics, and also from a method for operating the electropneumatic pressure control module.

12 Claims, 1 Drawing Sheet

(56) References Cited

U.S. PATENT DOCUMENTS

2004/0119331 A1* 6/2004 Long .................................. 303/3
2006/0152075 A1* 7/2006 Goebels et al. ................... 303/3

FOREIGN PATENT DOCUMENTS

| | | |
|---|---|---|
| EP | 1 028 043 | 8/2000 |
| GB | 2 270 130 | 3/1994 |
| WO | 03/033321 | 4/2003 |

OTHER PUBLICATIONS

European Patent Office, English Translation of International Preliminary Report on Patentability and Written Opinion, Jul. 10, 2012, from International Patent Application No. PCT/EP2010/069746, filed on Dec. 15, 2010.

International Search Report of PCT/EP2010/069746 dated Dec. 15, 2010.

* cited by examiner

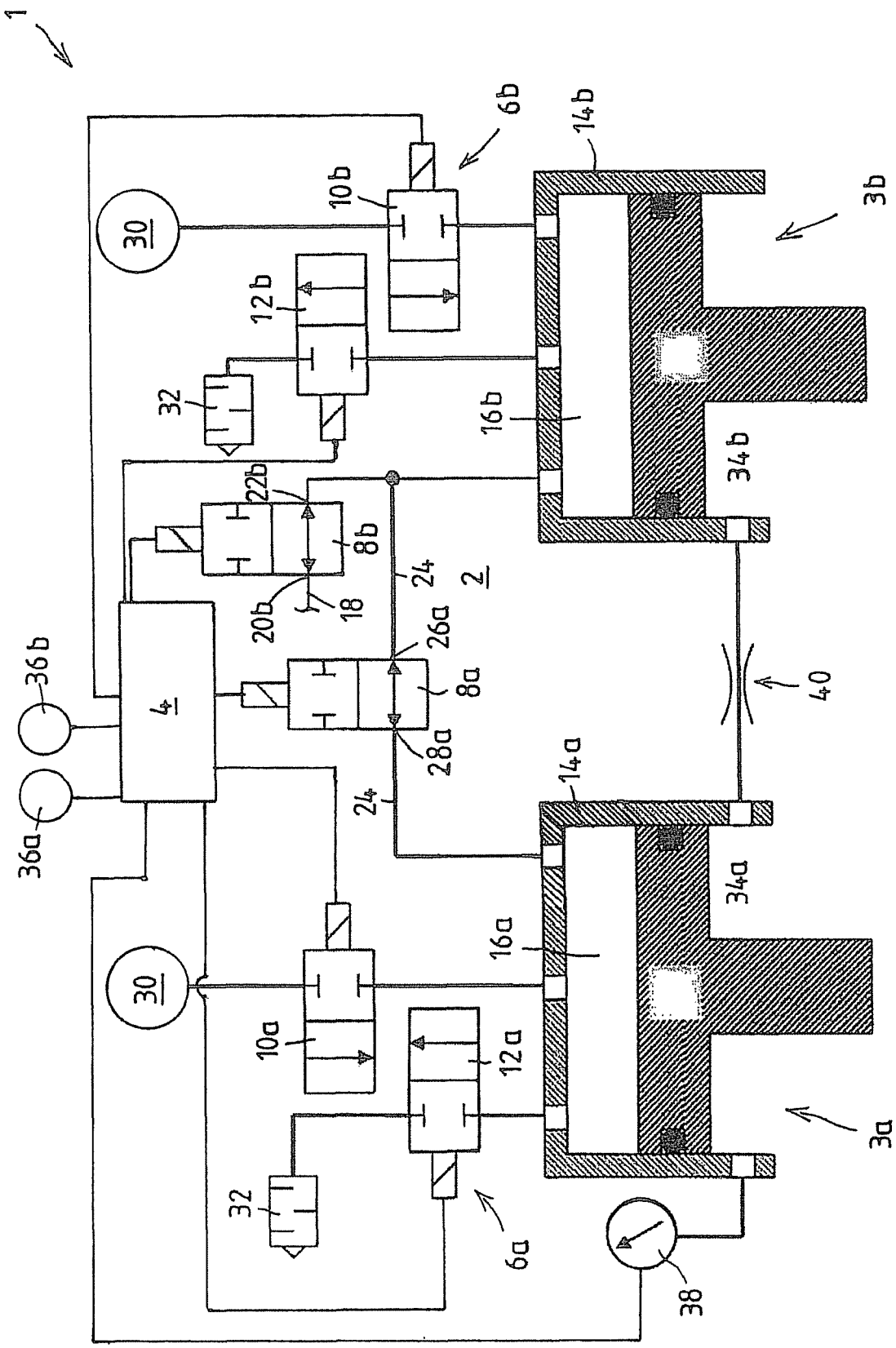

MULTI-CHANNEL PRESSURE CONTROL MODULE HAVING ONLY ONE PRESSURE SENSOR

FIELD OF THE INVENTION

The present invention proceeds from an electromagnetic pressure control module for a pressure-medium-actuated brake system of a motor vehicle, having at least two channels, the module being controlled electrically in undisrupted operation and pneumatically in the event of a fault in the electrics, and also from a method for operating the electropneumatic pressure control module.

BACKGROUND INFORMATION

Such a pressure control module is discussed for example in DE 40 30 980 A1. The two-channel pressure control module has a respective channel for a brake actuator of a right-hand wheel and a brake actuator for a left-hand wheel on an axle and contains, per channel, an electropneumatic valve unit which controls a relay valve and which has in each case one inlet valve and one outlet valve and also a backup valve.

In undisrupted operation, i.e. with the electrics and voltage supply intact, depending on a driver's request, an electric brake request signal is input into a control device which outputs control commands for the inlet valve or outlet valve, in order to ventilate or vent a control chamber of the associated relay valve. In the process, a pressure sensor connected to the control chamber of the relay valve measures the working pressure generated in a working chamber of the relay valve and sends a corresponding signal to the control device, in order to realize pressure control for the respective channel. In undisrupted operation, i.e. with the electrics intact, the backup valves are in the blocking position, i.e. a pneumatic brake request signal generated in parallel with the electric brake request signal is not transmitted to the control chambers of the relay valves. The pneumatic brake request signal and the electric brake request signal are generated by a foot brake module.

If the voltage supply fails or there is a fault in the electrics, the control device is deenergized and the backup valves switch under spring loading into their passage position, such that the pneumatic brake request signal switches as control pressure onto the control chambers of the relay valves, which thereupon generate an uncontrolled working pressure as braking pressure in their working chambers.

For separate control of the braking pressure in the two channels, the working chambers of the relay valves are connected to in each case one pressure sensor, such that a separate pressure sensor is available per channel and separate control of the two channels of the pressure control module is realized. However, as a result, the structure of such a pressure control module is relatively complex.

SUMMARY OF THE INVENTION

By contrast, the exemplary embodiments and/or exemplary methods of the present invention are based on the object of further developing a pressure control module of the above-mentioned kind, such that it has a simpler structure and is more cost-effective to manufacture.

This object may be achieved according to the exemplary embodiments and/or exemplary methods of the present invention by the features described herein.

According to the exemplary embodiments and/or exemplary methods of the present invention, there is proposed an electropneumatic pressure control module for a pressure-medium-actuated brake system of a motor vehicle, having at least two channels, said module being controlled electrically in undisrupted operation and pneumatically in the event of a fault in the electrics, wherein one electropneumatic valve unit, which is controllable by an electronic control device and has at least one backup valve, one inlet valve and one outlet valve, and also at least one relay valve having a control chamber and a working chamber are provided per channel, and the electropneumatic valve unit pneumatically controls the relay valve, the backup valve, in the event of a fault in the electrics, can be connected to a device for generating a control pressure that is dependent on a driver's request and also to the control chamber of the relay valve assigned to the channel in question, the working chamber of the relay valve of one channel is connected to at least one pneumatic brake actuator that is assigned to at least one wheel and the working chamber of the relay valve of another channel is connected to at least one other pneumatic brake actuator that is assigned to at least one other wheel, at least one pressure-medium connection that extends between the control chamber of the relay valve of the one channel and the control chamber of the relay valve of the other channel is provided, the backup valve of the one channel is arranged in the pressure-medium connection, at least one wheel speed sensor assigned to the one wheel and at least one wheel speed sensor assigned to the other wheel are provided, wherein each wheel speed sensor generates sensor signals which represent the wheel rotational behavior of the wheel assigned thereto, the backup valve of the other channel is connected upstream of the pressure-medium connection and of the backup valve of the one channel such that the pressure-medium connection and the backup valve of the one channel can be supplied with the control pressure that is dependent on the driver's request only by the backup valve of the other channel, there is provided only a single pressure sensor, which is connected to the working chamber of the relay valve of the one channel or to the working chamber of the relay valve of the other channel, and in undisrupted operation, the backup valve of the one channel, said backup valve being arranged in the pressure-medium connection between the control chambers of the relay valves, is controlled by the control device in a manner dependent on the sensor signals from the wheel speed sensors assigned to the one wheel and to the other wheel.

Thus, the backup valve of the one channel, which in the prior art is switched into the passage position only in disrupted operation, is switched into the passage position in undisrupted operation, too, in order to be able to achieve a pressure in the working chambers of the relay valves of the channels which is separate per channel, in order for example to realize for each channel slip control which is separate per channel, even though only a single pressure sensor is present for a plurality of channels.

In this case, the two backup valves are not connected in parallel in the control pressure line leading from the foot brake module, as in DE 40 30 980 A1, but in series, i.e. such that the backup valve of the one channel can input the control pressure generated by the foot brake module and dependent on the driver's request into the control chamber of the relay valve assigned to the one channel only when the backup valve assigned to the other channel is also switched into the passage position. This interconnection can be produced easily by the provision of corresponding channel bores in the valve block accommodating the valves.

Consequently, the backup valves, which are necessary in any case, are switched in terms of an advantageous combination of functions, both during undisrupted operation and during disrupted operation. Because disrupted electrics occur extremely rarely, as a result the functionality of the backup valves is already tested in undisrupted operation.

On the other hand, only a single pressure sensor is used for a plurality of channels, thereby resulting in the omission of pressure-conducting channels, a pressure sensor and the cabling of the pressure sensor.

The exemplary embodiments and/or exemplary methods of the present invention concern the aspect that different wheel speed behaviors of the wheel assigned to the one channel and the wheel assigned to the other channel, for example under µ split conditions, occur comparatively rarely, whereas synchronized control of the two channels given identical rotational behavior of the wheels represents the normal case.

The method for operating the electropneumatic pressure control module provides that, starting from an at least three-dimensional characteristic diagram which is stored in the control device and in which the dependence of an opening duration of the inlet valve and/or of an opening duration of the outlet valve on a setpoint working pressure and on an actual working pressure is stored, when sensor signals that represent an identical wheel rotational behavior of the one wheel and of the other wheel are input into the control device, the backup valve of the one channel is switched into the passage position by the control device in order to connect the control chamber of the relay valve of the one channel to the control chamber of the relay valve of the other channel, the actual working pressure in the working chamber of the relay valve of the one channel or in the working chamber of the relay valve of the other channel is measured by the single pressure sensor, and a corresponding actual working pressure signal is sent to the control device for synchronous pressure control in all channels, when sensor signals that represent a different wheel rotational behavior of the one wheel and of the other wheel are input into the control device, the backup valve, arranged in the pressure-medium connection, of the one channel is switched into the blocking position, in order to separate the control chamber of the relay valve of the one channel from the control chamber of the relay valve of the other channel, and the actual working pressure in the one working chamber, which is connected to the pressure sensor, of the relay valve of the one channel or in the other working chamber, which is connected to the pressure sensor, of the relay valve of the other channel is measured and an actual working pressure signal for the one channel or for the other channel is sent to the control device, in order to generate a working pressure for the one brake actuator or for the other brake actuator in the context of pressure control of the one channel or of the other channel, the characteristic diagram is used to determine the opening duration of the inlet valve and/or the opening duration of the outlet valve of the electropneumatic valve unit of the other channel or the opening duration of the inlet valve and/or the opening duration of the outlet valve of the electropneumatic valve unit of the one channel in a manner dependent on the value of the setpoint working pressure and dependent on the value of the actual working pressure present during a braking operation that has taken place still with an identical wheel rotational behavior, and the inlet valve or the outlet valve is opened for the determined opening duration, in order to generate a working pressure for the other brake actuator or for the one brake actuator in the working chamber of the relay valve of the other channel or in the working chamber of the relay valve of the one channel in the context of a pressure control of the other channel or of the one channel.

The characteristic diagram, in which the dependence of an opening duration of the inlet valve and/or of an opening duration of the outlet valve on a setpoint working pressure and on an actual working pressure is stored, may be programmed end-of-line and reproduces the rule, present on the basis of structural boundary conditions, according to which for example an opening pulse of particular duration of the inlet valve generates a particular control pressure in the control chamber of the associated relay valve, whereupon the relay valve outputs a particular actual working pressure which can be measured. Since the opening pulse, by way of which the control device acted on the inlet valve, corresponds to a particular brake actuation signal and therefore also to a particular setpoint working pressure, there is a relationship between the duration of the opening pulse, the actual working pressure to be expected and the setpoint working pressure, which is mapped in the characteristic diagram. Thus, the characteristic diagram can be used to determine for example an actual working pressure to be expected in a manner dependent on the brake request (setpoint working pressure) and on the duration of the switching operations of the inlet and outlet valves, without a pressure sensor for measuring this actual working pressure being necessary for this purpose. Conversely, the characteristic diagram can be used to determine the opening duration of the inlet valve and/or the opening duration of the outlet valve of the other channel, which is cut off from the pressure sensor given different wheel rotational behavior, in a manner dependent on the value of the setpoint working pressure (brake request) and dependent on the value of the actual working pressure present during a braking operation that has taken place still with an identical wheel rotational behavior and is then still measured by the pressure sensor. This opening duration determined by way of the characteristic diagram then determines the real actual working pressure in the working chamber of the relay valve of the other channel, if there is a different wheel rotational behavior and synchronous control of the channels is no longer taking place.

The value for the setpoint working pressure may in this case be generated by an ABS (antilock braking system), ESP (electronic stability program), ASR (anti-slip regulation) or ACC (adaptive cruise control) system and/or in a manner dependent on a driver's request, i.e. the setpoint working pressure originates directly from a service brake value transmitter such as the pneumatic channel of a foot brake module.

On account of these measures, synchronous control of the working pressure therefore takes place in the event of identical wheel rotational behavior, whereas, in the event of different wheel rotational behavior, the working pressure is controlled only in the channel having the single pressure sensor and the working pressure is controlled on the basis of the characteristic diagram in the channel without a pressure sensor.

Advantageous developments and improvements of the exemplary embodiments and/or exemplary methods of the present invention may be provided by way of the features further described herein.

Particularly, the working chamber of the relay valve of the one channel may be connected in terms of flow to the working chamber of the relay valve of the other channel by at least one throttle. As a result, pressure equalization takes place between the two working chambers, and, in the case of identical wheel rotational behavior on the left and the right, this also causes an advantageously equal braking action on the right and the left. In addition, pressure differences can be compensated by tolerance- or sealing-conditioned different geometries of the relay valves. On the other hand, pressure compensation by way of the throttle is known to occur gradually, such that the slow pressure compensation has little effect on a pressure difference in the working chambers of the relay valves of different channels which is present during brief ABS operation having a different wheel rotational behavior.

By way of example, the wheel speed sensors that detect the wheel rotational behavior of the different channels are included in an ABS, ASR, ESP or ACC system, such that the signals from these already present wheel speed sensors can also be used for pressure control in the channel without its own pressure sensor, without additional components being necessary for this purpose.

More precise details can be found in the following description of an exemplary embodiment.

Drawing

Exemplary embodiments of the present invention are illustrated in the drawing and explained in more detail in the following description.

BRIEF DESCRIPTION OF THE DRAWING

The FIGURE shows a schematic structural plan of an electropneumatic pressure control module according to an embodiment of the present invention.

DETAILED DESCRIPTION

FIG. 1 illustrates an embodiment of an electropneumatic pressure control module 1 of an electronic braking system (EBS) of a commercial vehicle, which generates for example the working or braking pressure in the brake actuators of the rear axle of a commercial vehicle in a manner dependent on an electric and pneumatic brake request signal which is formed for example in the electric rear axle channel and the pneumatic channel of a foot brake module (not shown here).

The pressure control module 1 comprises for example two channels, one channel 3a for the brake actuator of the right-hand wheel of the rear axle and another channel 3b for the brake actuator of the left-hand wheel.

The pressure control module 1 is consequently controlled electrically in a known manner in undisrupted operation and is controlled pneumatically in the event of a fault in the electrics, for example in the event of a voltage failure.

The pressure control module 1 has a valve block 2 and one electropneumatic valve unit 6a, 6b, which can be controlled by an electronic control device 4, per channel, said electropneumatic valve units 6a, 6b having in each case one backup valve 8a, 8b, in each case one inlet valve 10a, 10b and in each case one outlet valve 12a, 12b, and also at least in each case one relay valve 14a, 14b having a control chamber 16a, 16b and a working chamber 18a, 18b, wherein the electropneumatic valve unit 6a, 6b pneumatically controls in each case the associated relay valve 14a, 14b.

The backup valves 8a, 8b, the inlet valves 10a, 10b and the outlet valves 12a, 12b may be 2/2-way solenoid valves, wherein the inlet and outlet valves 10a, 10b, 12a, 12b are in the blocking position under spring loading in the deenergized basic position and switch into the passage position when energized, and the backup valves 8a, 8b are in the passage position under spring loading in the deenergized basic position and switch into the blocking position when energized. These electromagnetic valves 8a, 8b, 10a, 10b, 12a, 12b, 16a, 16b are controlled by the electronic control device 4.

From the foot brake module, which is not shown here for reasons of scale, a control pressure line 18 leads to a connection 20b of the backup valve 8b assigned to the other channel 3b. In the event of a fault in the electrics, this backup valve 8b is deenergized and therefore switched into the passage position, as a result of which the control pressure introduced by the foot brake module is switched to its other connection 22b, which is connected to a compressed air duct 24 formed in the valve block 2.

The control chambers 16a, 16b of the relay valves 14a, 14b of the one channel 3a and of the other channel 3b are connected to this compressed air duct 24. In addition, the backup valve 8a of the one channel 3a is also arranged in this compressed air duct 24, said backup valve 8a being connected by way of its one connection 26a to the control chamber 16a of the relay valve 14a of the one channel 3a and by way of its other connection 28a to the control chamber 16b of the relay valve 14b of the other channel 3b.

Thus, the backup valve 8b of the other channel 3b is connected upstream of the compressed air duct 24 and the backup valve 8a of the one channel 3a such that the compressed air duct 24 and the backup valve 8a of the one channel 3a can be supplied with the control pressure that is dependent on the driver's request only by the backup valve 8b of the other channel 3b. Therefore, on account of the backup valves 8a, 8b, firstly the control chambers 16a, 16b of the relay valves 14a, 14b can be connected to the foot brake module and thus to the control pressure generated there.

The inlet valves 10a, 10b are connected in each case to a compressed air store 30 of the rear axle, and in addition they open by way of their other connections into the control chambers 16a, 16b of the associated relay valves 14a, 14b. The outlet valves 12a, 12b are thus likewise connected to the control chambers 16a, 16b of the relay valves 14a, 14b. Furthermore, they are connected to pressure sinks 32, such as sound-insulated vents.

In a known manner, the control chambers 16a, 16b of the relay valves 14a, 14b can be ventilated or vented by switching the inlet and outlet valves 10a, 10b, 12a, 12b, in order to generate appropriate working pressures in working chambers 34a, 34b of the relay valves 14a, 14b. In the context of slip-controlled braking, the inlet and outlet valves 10a, 10b, 12a, 12b can also be controlled in a clocked manner, in particular for maintaining, lowering and raising the working pressure in the working chambers 34a, 34b, which are connected to brake chambers of the brake actuators (not shown here) of the right-hand and left-hand wheels. The function of such relay valves 14a, 14b is well known. Therefore, it will not be described in more detail here.

Furthermore, a wheel speed sensor 36b assigned to the right-hand wheel or to the other channel 3b and at least one wheel speed sensor 36a assigned to the left-hand wheel or to the one channel 3a are provided, wherein each wheel speed sensor 36a, 36b inputs sensor signals into the control device 4, said signals representing the wheel rotational behavior of the wheel assigned thereto. In the control device 4 there is furthermore stored a three-dimensional characteristic diagram, in which the dependence of an opening duration of the inlet valves 10a, 10b and/or an opening duration of the outlet valves 12a, 12b on a setpoint working pressure and on an actual working pressure is stored.

Only one pressure sensor 38 is assigned to the pressure control module 1, said pressure sensor 38 being connected for example to the working chamber 34a of the relay valve 14a of the one channel 3a and consequently measuring the working pressure that prevails there.

Last but not least, the working chamber 34a of the relay valve 14a of the one channel 3a is connected in terms of flow to the working chamber 34b of the relay valve 14b of the other channel 3b by a throttle 40.

The pressure control module 1 then functions as follows:

In undisrupted operation, i.e. with intact voltage supply and intact control device 4, the backup valve 8a of the one channel 3a, said backup valve 8a being arranged in the compressed air duct 24 between the control chambers 16a, 16b of the relay valves 14a, 14b, is controlled by the control device 4 in a manner dependent on the sensor signals from the wheel speed sensors 36a, 36b assigned to the right-hand wheel and the left-hand wheel, as described in the following. The backup valve 8b of the other channel 3b remains closed in undisrupted operation, in order to prevent the control pressure formed by the foot brake module from being introduced into the control chambers 16a, 16b of the relay valves 14a, 14b.

When sensor signals representing identical wheel rotational behavior of the right-hand wheel and of the left-hand wheel are input into the control device 4 by the wheel speed sensors 36a, 36b, the backup valve 8a of the one channel 3a is switched into the passage position by the control device 4, in order to connect the control chamber 16a of the relay valve 14a of the one channel 3a to the control chamber 16b of the relay valve 14b of the other channel 3b.

Furthermore, the control pressure in the control chambers 16a, 16b of the relay valves 14a, 14b is formed by switching the inlet and outlet valves 10a, 10b, 12a, 12b, wherein these valves are controlled by the control device 4 in a manner corresponding to the demand by the brake request signal. As a consequence of the control pressure in the control chambers 16a, 16b, an actual working pressure is formed in the working chambers 34a, 34b of the relay valves 14a, 14b, wherein the actual working pressure in the working chamber 34a of the relay valve 14a of the one channel 3a is measured by the single pressure sensor 38 and a corresponding actual working pressure signal is sent to the control device 4 for synchronous pressure control in the two channels 3a, 3b. In other words, the difference between the measured actual working pressure and the setpoint working pressure, which is specified for example by a slip-control device such as ABS, ASR or ESP and by the driver's brake request signal, is corrected synchronously for both channels 3a, 3b.

When sensor signals representing a different wheel rotational behavior of the right-hand wheel and of the left-hand wheel are input into the control device 4, the backup valve 8a of the one channel 3a, said backup valve 8a being arranged in the compressed air duct 24, is switched into the blocking position, in order to separate the control chamber 16a of the relay valve 14a of the one channel 3a from the control chamber 16b of the relay valve 14b of the other channel 3b. The backup valve 8b of the other channel 3b continues to be closed. Furthermore, the actual working pressure in the working chamber 34a, connected to the pressure sensor 38, of the relay valve 14a of the one channel 3a is measured and an actual working pressure signal for the one channel 3a is sent to the control device 4, in order to generate a working pressure for the one brake actuator in the context of pressure control of the one channel 3a.

Then, the characteristic diagram stored in the control device 4 is used to determine the opening duration of the inlet valve 10b and/or the opening duration of the outlet valve 12b of the other channel 3b in a manner dependent on the specified value of the setpoint working pressure, which is specified for example by a slip-control device such as ABS, ASR or ESP and by the driver's brake request signal, and in a manner dependent on the value of the actual working pressure which is present during a braking operation that has taken place still with an identical wheel rotational behavior and was able to be measured by the single pressure sensor 38 still in the context of a previous synchronous pressure control of both channels 3a, 3b with the backup valve 8a of the one channel 3a still open. The inlet valve 10b or the outlet valve 12b of the other channel 3b is then opened for the determined opening duration, in order to generate a working pressure for the other brake actuator in the working chamber 34b of the relay valve 14b of the other channel 3b in the context of pressure control. The characteristic diagram, which was initially programmed end-of-line, may be corrected continuously in the braking operation in the sense of an "adaptive" characteristic diagram given synchronous and controlled synchronization of the two channels 3a, 3b (identical wheel rotational behavior), in order to adapt it to altered boundary conditions.

In disrupted operation, i.e. in the event of faulty voltage supply or defective control device 4, all of the 2/2-way solenoid valves 8a, 8b, 10a, 10b, 12a, 12b are switched into the deenergized state, such that the inlet valves 10a, 10b and the outlet valves 12a, 12b switch under spring loading into the blocking position shown in the figure and the two backup valves 8a, 8b switch into the passage position shown in the figure. Then, the pneumatic control pressure introduced by the foot brake module can initially pass through the open backup valve 8b of the other channel 3b and thus flow into the control chamber 16b of the relay valve 14b of the other channel 3b and into the compressed air duct 24. From the compressed air duct 24, the control pressure also passes into the control chamber 16a of the relay valve 14a of the one channel 3a via the open backup valve 8a of the one channel 3a. Consequently, a substantially identical working pressure is generated synchronously in the working chambers 34a, 34b of the two relay valves 14a, 14b, said working pressure being passed on to the corresponding brake actuators. Since the control device 4 is not functional in this case, the pressure sensor 38 is not used, and so the working pressure is formed only in an uncontrolled manner dependent on the brake request.

According to a further embodiment (not shown here), the single pressure sensor 38 is not connected to the working chamber 34a of the relay valve 14a of the one channel 3a, but to the working chamber 34b of the relay valve 14b of the other channel 3b and measures the actual working pressure prevailing there.

Then, when sensor signals representing identical wheel rotational behavior of the one wheel and of the other wheel are input into the control device 4, the backup valve 8a of the one channel 3a is in turn switched into the passage position by the control device 4, in order to connect the control chamber 16a of the relay valve 14a of the one channel 3a to the control chamber 16b of the relay valve 14b of the other channel 3b. Furthermore, the actual working pressure in the working chamber 34b of the relay valve 14b of the other channel 3b is measured by the single pressure sensor 38 and a corresponding actual working pressure signal is sent to the control device 4 for synchronous pressure control in both channels 3a, 3b.

When sensor signals representing a different wheel rotational behavior of the one wheel and of the other wheel are input into the control device 4, the backup valve 8a of the one channel 3a, said backup valve 8a being arranged in the pressure-medium connection 24, is switched into the blocking position, in order to separate the control chamber 16a of the relay valve 14a of the one channel 3a from the control chamber 16b of the relay valve 14b of the other channel 3b, as described in the previous exemplary embodiment.

However, the actual working pressure in the other working chamber 34b, connected to the pressure sensor 38, of the relay valve 14b of the other channel 3b is measured and an actual working pressure signal for the other channel 3b is sent to the control device 4, in order to generate a working pressure for the other brake actuator in the context of pressure control of the other channel 3b.

Finally, the characteristic diagram is used to determine the opening duration of the inlet valve 10a and/or the opening duration of the outlet valve 12a of the electropneumatic valve unit 6a of the one channel 3a in a manner dependent on the value of the setpoint working pressure and dependent on the value of the actual working pressure which is present during a braking operation that has taken place still with an identical wheel rotational behavior, and the inlet valve 10a or the outlet valve 12a is opened for the determined opening duration, in order to generate a working pressure for the one brake actuator in the working chamber 34a of the relay valve 14a of the one channel 3a in the context of pressure control of the one channel 3a.

According to a further embodiment, the speed evaluation of the wheel speed sensors 36a, 36b is carried out not by the control device 4 assigned to the pressure control module 1 but for example by a central control device, for example an ABS control device, which communicates with the control device 4 of the pressure control module 1, in order to transfer the wheel speed information thereto.

A common feature of the embodiments is that, in the event of a rapid brake actuation, i.e. in the event of a brake actuation that exceeds a certain limit actuation speed or acceleration, the inlet valves 10a, 10b and the outlet valves 12a, 12b are actuated synchronously by the control device 4 in a manner dependent on the signal from the pressure sensor 38.

By contrast, in the event of a slow brake actuation, i.e. in the event of a brake actuation that reaches or drops below the limit actuation speed or acceleration, the inlet valves 10a, 10b and the outlet valves 12a, 12b are actuated individually or separately.

In both cases, any pressure differences in the control chambers 16a, 16b are then compensated by the then open connection through the compressed air duct 24.

The list of reference signs is as follows:
1 Pressure control module
2 Valve block
3a/b Channel
4 Control device
6a/b Valve unit
8a/b Backup valve
10a/b Inlet valve
12a/b Outlet valve
14a/b Relay valve
16a/b Control chamber
18 Control pressure line
20b Connection
22b Connection
24 Compressed air duct
26a Connection
28a Connection
30 Compressed air store
32 Pressure sink
34a/b Working chamber
36a/b Wheel speed sensor
38 Pressure sensor
40 Throttle

The invention claimed is:

1. An electropneumatic pressure control module for a pressure-medium-actuated brake system of a motor vehicle, comprising:
at least two channels, the module being controlled electrically in undisrupted operation and pneumatically in the event of a fault in the electrics, including:
a) one electropneumatic valve unit, which is controllable by an electronic control device and has at least a first backup valve and a second backup valve, one inlet valve and one outlet valve, and also at least one relay valve having a control chamber and a working chamber are provided per channel, and the electropneumatic valve unit pneumatically controls the relay valve,
b) the first backup valve, in the event of a fault in the electrics, is connectable to a device for generating a control pressure that is dependent on a driver's request and also to the control chamber of the relay valve assigned to the channel in question,
c) the working chamber of the relay valve of one channel is connected to at least one pneumatic brake actuator that is assigned to at least one wheel and the working chamber of the relay valve of the other channel is connected to at least one other pneumatic brake actuator that is assigned to at least one other wheel,
d) at least one pressure-medium connection that extends between the control chamber of the relay valve of the one channel and the control chamber of the relay valve of the other channel is provided,
e) the first backup valve of the one channel is arranged in the pressure-medium connection,
f) at least one wheel speed sensor assigned to the one wheel and at least one wheel speed sensor assigned to the other wheel are provided, wherein each wheel speed sensor generates sensor signals which represent the wheel rotational behavior of the wheel assigned thereto, and
wherein:
g) the second backup valve of the other channel is connected upstream of the pressure-medium connection and of the first backup valve of the one channel such that the pressure-medium connection and the first backup valve of the one channel can be supplied with the control pressure that is dependent on the driver's request only by the second backup valve of the other channel,
h) a single pressure sensor, which is connected to the working chamber of the relay valve of the one channel or to the working chamber of the relay valve of the other channel, and
i) in undisrupted operation, the first backup valve of the one channel, the first backup valve being arranged in the pressure-medium connection between the control chambers of the relay valves, is electrically controlled by the control device in a manner dependent on the sensor signals from the wheel speed sensors assigned to the one wheel and to the other wheel;

wherein the inlet valves, the outlet valves and the backup valves are each in the form of a 2/2-way solenoid valve having a blocking position and a passage position.

2. The pressure control module of claim 1, wherein:
a) one connection of the backup valve of the other channel is connected to the device for generating the control pressure that is dependent on a driver's request, and an other connection of the backup valve of the other channel is connected to the control chamber of the relay valve of the other channel,
b) one connection of the backup valve of the one channel is connected to the control chamber of the relay valve of the one channel and an other connection of the backup valve of the one channel is connected to the other connection of the backup valve of the other channel and also to the control chamber of the relay valve of the other channel.

3. The pressure control module of claim 2, wherein the working chamber of the relay valve of the one channel is connected in terms of flow to the working chamber of the relay valve of the other channel by at least one throttle.

4. The pressure control module of claim 2, wherein the wheel speed sensors are included in an ABS, ASR, ESP or ACC system.

5. The pressure control module of claim 2, wherein the working chamber of the relay valve of the one channel is connected in terms of flow to the working chamber of the relay valve of the other channel by at least one throttle, and wherein the wheel speed sensors are included in an ABS, ASR, ESP or ACC system.

6. The pressure control module of claim 1, wherein the working chamber of the relay valve of the one channel is connected in terms of flow to the working chamber of the relay valve of the other channel by at least one throttle.

7. The pressure control module of claim 1, wherein the wheel speed sensors are included in an ABS, ASR, ESP or ACC system.

8. The pressure control module of claim 1, wherein the working chamber of the relay valve of the one channel is connected in terms of flow to the working chamber of the relay valve of the other channel by at least one throttle, and wherein the wheel speed sensors are included in an ABS, ASR, ESP or ACC system.

9. A method for operating the electropneumatic pressure control module, the method comprising:
starting from an at least three-dimensional characteristic diagram which is stored in a control device of the module and in which the dependence of an opening duration of an inlet valve and/or of an opening duration of an outlet valve on a setpoint working pressure and on an actual working pressure is stored,
a) when sensor signals that represent an identical wheel rotational behavior of one wheel and of an other wheel are input into the control device, a first backup valve of one channel is switched into a passage position by the control device to connect the control chamber of the relay valve of the one channel to the control chamber of the relay valve of the other channel, the actual working pressure in the working chamber of the relay valve of the one channel or in the working chamber of the relay valve of the other channel is measured by the single pressure sensor, and a corresponding actual working pressure signal is sent to the control device for synchronous pressure control in each of the channels,
b) when sensor signals that represent a different wheel rotational behavior of the one wheel and of the other wheel are input into the control device, the backup valve, arranged in the pressure-medium connection, of the one channel is switched into the blocking position, to separate the control chamber of the relay valve of the one channel from the control chamber of the relay valve of the other channel, and
b1) the actual working pressure in the one working chamber, which is connected to the pressure sensor, of the relay valve of the one channel (3a) or in the other working chamber, which is connected to the pressure sensor, of the relay valve of the other channel is measured and an actual working pressure signal for the one channel or for the other channel is sent to the control device, to generate a working pressure for the one brake actuator or for the other brake actuator in the context of pressure control of the one channel or of the other channel,
b2) the characteristic diagram is used to determine the opening duration of the inlet valve and/or the opening duration of the outlet valve of the electropneumatic valve unit of the other channel or the opening duration of the inlet valve and/or the opening duration of the outlet valve of the electropneumatic valve unit of the one channel in a manner dependent on the value of the setpoint working pressure and dependent on the value of the actual working pressure present during a braking operation that has taken place still with an identical wheel rotational behavior, and the inlet valve or the outlet valve is opened for the determined opening duration, to generate a working pressure for the other brake actuator or for the one brake actuator in the working chamber of the relay valve of the other channel or in the working chamber of the relay valve of the one channel in the context of a pressure control of the other channel or of the one channel;
wherein the electropneumatic pressure control module for a pressure-medium-actuated brake system of a motor vehicle, includes at least two channels, the module being controlled electrically in undisrupted operation and pneumatically in the event of a fault in the electrics, including:
a) one electropneumatic valve unit, which is controllable by an electronic control device and has at least one backup valve, one inlet valve and one outlet valve, and also at least one relay valve having a control chamber and a working chamber are provided for each of the channels, and the electropneumatic valve unit pneumatically controls the relay valve,
b) the first backup valve, in the event of a fault in the electrics, is connectable to a device for generating a control pressure that is dependent on a driver's request and also to the control chamber of the relay valve assigned to the corresponding channel,
c) the working chamber of the relay valve of one channel is connected to at least one pneumatic brake actuator that is assigned to at least one wheel and the working chamber of the relay valve of the other channel is connected to at least one other pneumatic brake actuator that is assigned to at least one other wheel,
d) at least one pressure-medium connection that extends between the control chamber of the relay valve of the one channel and the control chamber of the relay valve of the other channel is provided, e) the first backup valve of the one channel is arranged in the pressure-medium connection, f) at least one wheel speed sensor assigned to the one wheel and at least one wheel speed sensor assigned to the other wheel are provided, wherein each wheel speed sensor generates sensor signals which represent the wheel rotational behavior of the wheel assigned thereto, and wherein:

g) a second backup valve of the other channel is connected upstream of the pressure-medium connection and of the backup valve of the one channel such that the pressure-medium connection and the first backup valve of the one channel can be is suppliable with the control pressure that is dependent on the driver's request only by the second backup valve of the other channel, h) a single pressure sensor, which is connected to the working chamber of the relay valve of the one channel or to the working chamber of the relay valve of the other channel, and i) in undisrupted operation, the first backup valve of the one channel, the first backup valve being arranged in the pressure-medium connection between the control chambers of the relay valves, is controlled by the control device in a manner dependent on the sensor signals from the wheel speed sensors assigned to the one wheel and to the other wheel.

10. The method for operating a pressure control module as claimed in claim 9, wherein the characteristic diagram is adapted in braking operation.

11. The method for operating a pressure control module of claim 10, wherein the value for the setpoint working pressure is generated by an ABS, ESP, ASR or ACC system and/or in a manner dependent on a driver's request.

12. The method for operating a pressure control module of claim 9, wherein the value for the setpoint working pressure is generated by an ABS, ESP, ASR or ACC system and/or in a manner dependent on a driver's request.

\* \* \* \* \*